Oct. 6, 1925.
1,556,291
G. L. V. MAES ET AL
MOLDING MACHINE FOR DENTAL PURPOSES
Filed Aug. 31, 1923    3 Sheets-Sheet 3
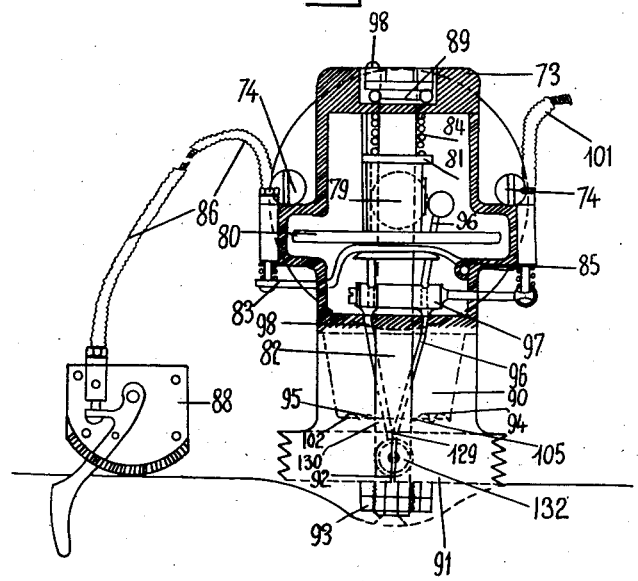
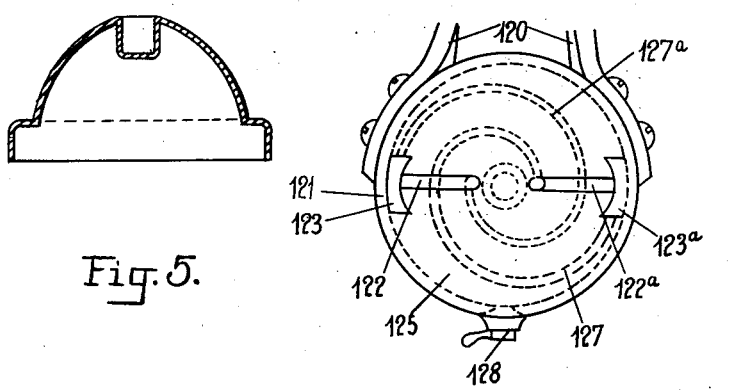

Patented Oct. 6, 1925.

1,556,291

UNITED STATES PATENT OFFICE.

GEORGES LOUIS VICTOR MAES AND ARMAND LEON CLEMENT MAES, OF PARIS, FRANCE.

MOLDING MACHINE FOR DENTAL PURPOSES.

Application filed August 31, 1923. Serial No. 660,292.

*To all whom it may concern:*

Be it known that we, GEORGES LOUIS VICTOR MAES and ARMAND LEON CLEMENT MAES, citizens of the French Republic, residing at 5 Rue Saint-Martin (Seine), Paris, France, have invented certain new and useful Improvements in Molding Machines for Dental Purposes, of which the following is a specification.

Our invention relates to a machine for molding metals and is more particularly designed for dental purposes. It has for its object: 1. To carry out by means of an electro-mechanical device the work hitherto accomplished by means of various apparatus and processes carried out with the aid of compressed air or steam and 2. To continue the action of the blow-pipe and hence the melting and cooling operations while the apparatus oscillates.

Our invention is hereinafter more particularly described with reference to the accompanying drawings showing by way of example and in a schematic form one embodiment of a molding machine as well as the particulars thereof; and in which—

Fig. 3 is a plan view of the friction clutch and of the blow-pipe tap both actuated by a flexible connection.

Fig. 4 is a plan view of the tray carrying the molds and of the concentric tightening disc.

Fig. 5 is a view of the fixing cones for the pieces required to be reproduced; the cones are generally made of stamped aluminum.

Fig. 6 is a sectional view of the tray provided with a screw and a screw head.

Figure 1:
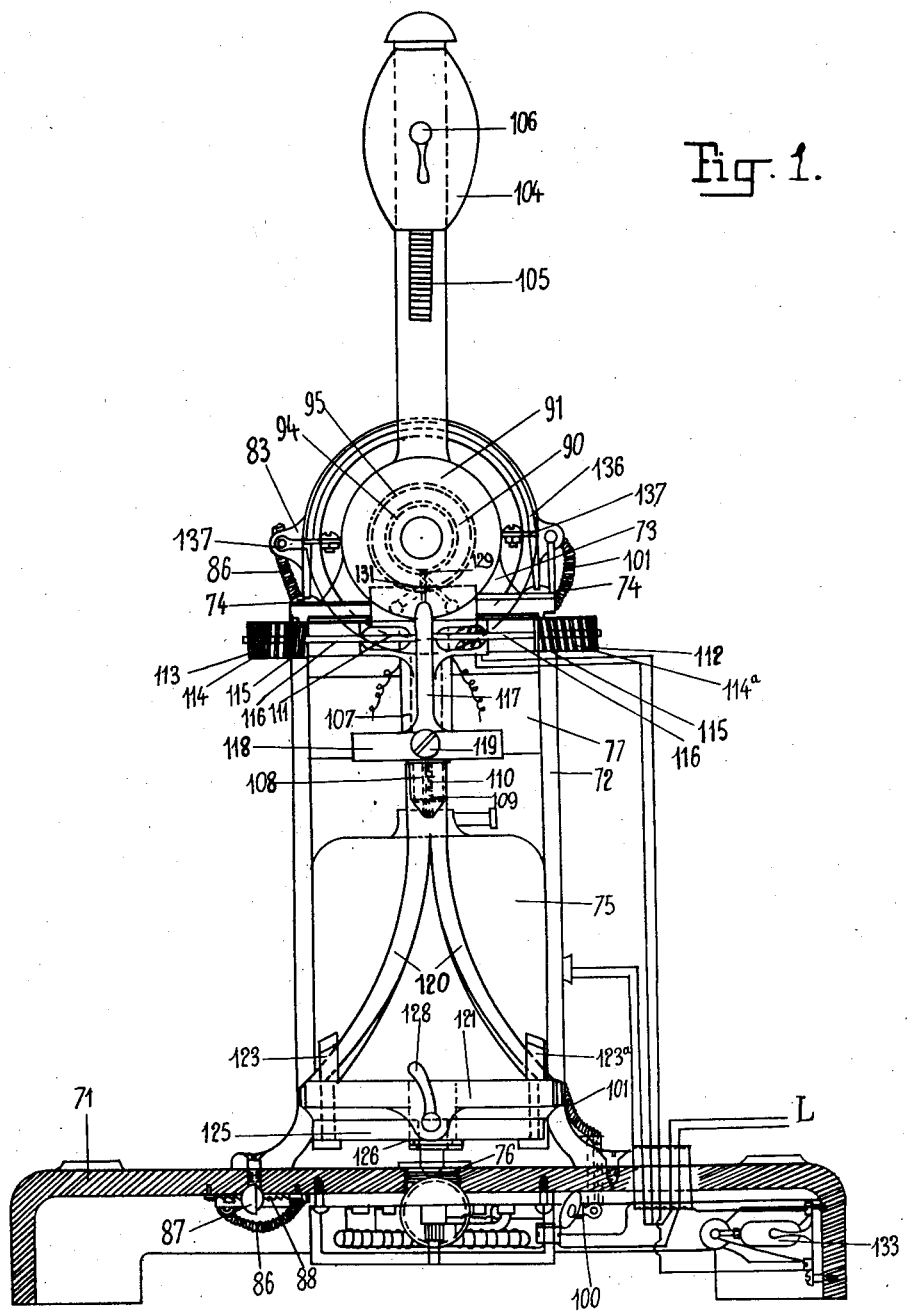
Fig. 1 is a front view of the molding machine.

In these figures 71 is a framework having a metal pedestal comprising a lower cylinder 72 and an upper cylinder 73 joined by screws 74 and keyed in any suitable manner. The cylinder 72 contains an electric motor 75 regulated by a rheostat and the shaft of which bears upon a ball stop bearing 76. The electric motor 75 drives the air compressor 77 similarly locked in the cylinder 72 by means of screws.

The air compressor 77 carries upon the free end of its axis a flat roller or disc 79 driving—or not driving—by friction the movable disc 80 formed integrally with the sleeve 81 sliding upon the main shaft 82 and subjected either to the action of the fork 83 or of the spiral spring 84. The fork (83, Fig. 3) jointed at 85 to the cylinder 73 is actuated by the flexible cord or connection 86 drawn by the handle 87 mounted on the toothed sector 88 fixed under the frame pedestal 71. The main axis passes throughout the cylinder 73 and turns in ball races; it carries at its rear end a regulating cone 89 to make up for the vertical plug of the moving parts.

Figure 2:
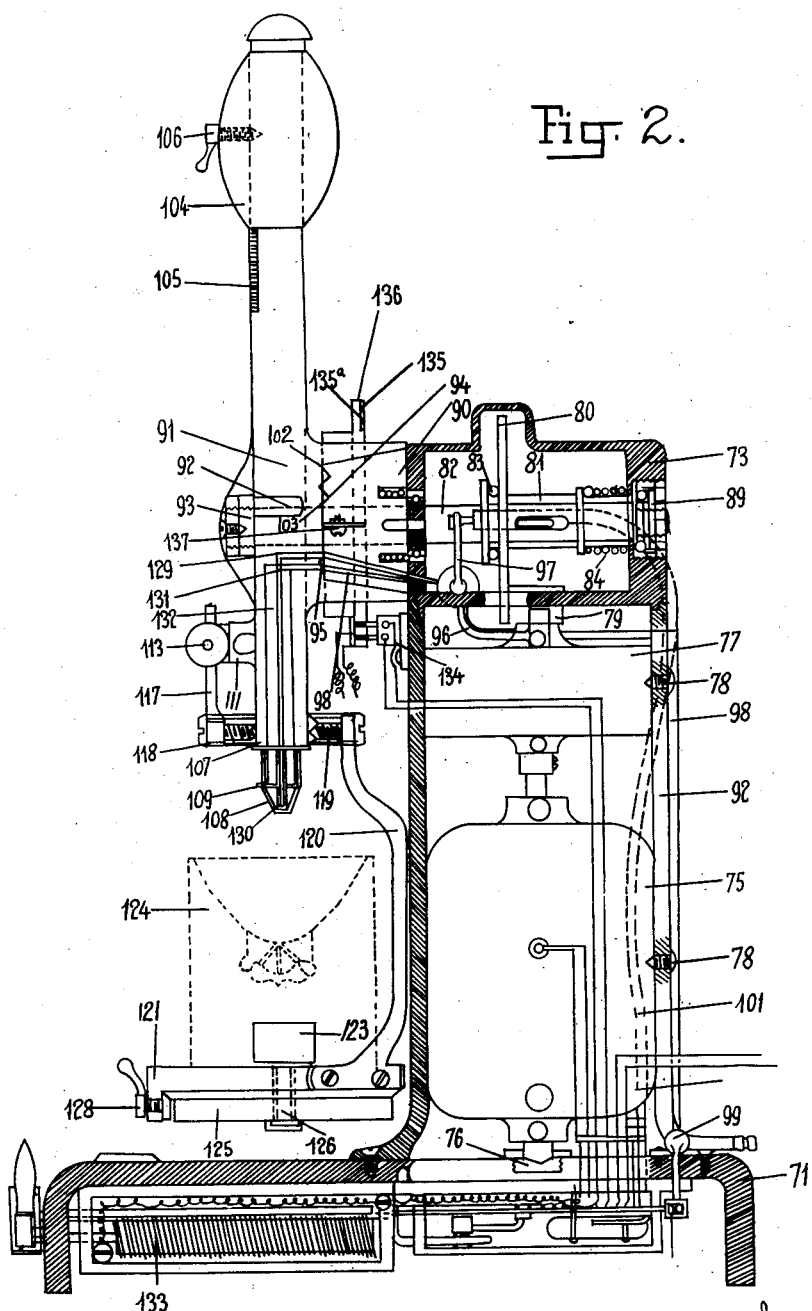
Fig. 2 is a side view of the molding machine.

A truncated cone of hard metal 90 is fixed upon the front face of the cylinder 73 and is traversed by the main shaft 82 which may turn therein accurately. The said truncated cone is hermetically covered over by an armed hub 91 keyed upon the main shaft by a cotter pin 92 and nuts 93. The hub 91 is designed to turn upon the truncated cone 90 made integral with the cylinder 73; this hub is set in motion by the main axis 82 actuated by the disc 80—provided with a sleeve—by the flat roller 79, the air compressor 77 and the electric motor 78. The hub 91 and the cone 90 are hollowed out upon their adjacent faces so as to form two circular channels 94 and 95 forming conduits for the air coming from the air compressor 77 through the pipe 96 which passes through the plug 97; these conduits being actuated together or separately by means of the special rod 100 and of the flexible connection 101. This pipe 98 passes likewise through the cone 90 and ends in the channel 95; the pipe 96 ends in a channel 94. The tightness of the hub on the cone is ensured by joints of suitable material fitted at 102 and 103. The armed hub 91 is carried at its upper end by a movable counterweight 104 sliding upon a balance ladder 105 and fixed at the required point by means of a stop screw 106. The said hub 91 is terminated at its lower end by a blow-pipe 107 taken out of the metal mass and the mouth of which is covered over by a movable sleeve 108 allowing it to be lengthened and fixed at any given point by inserting the pin 109 of the blow-pipe 107 in one of the notches 110. At the upper part of the blow-pipe 107 is formed a shoulder 111 upon which is fixed a spring device comprising two cylinders 112 and 113 arranged face to face and containing each a spiral spring 114 and 114$^a$ acting upon the tray 115 secured to the connecting rod 116 and upon the rod 117 connected to a ring 118 oscillating about an axis 119 secured to the blow-pipe 107. This ring 118 carries a handle 120 to which is fixed—while insulated therefrom—a tray 121 which may be similar to that of the first arrangement (Fig. 2) or be provided with straight grooves 122 122ª wherein slide jaws 123—123ª intended to grasp and hold the mold 124. These jaws 123 are set in motion by a disc 125 movable about an axis 126 of the tray 121. The movable disc 125 (Fig. 4) is hollowed out to form two concentric grooves 127 wherein slide jaws 123 which while acted upon by these grooves 127 and 127ª go to or come from the centre and follow the straight grooves 122 and 122ª formed in the fixed tray 121. The latter carries at its front end a screw and lever 28 serving to lock the movable disc 125 at the required spot.

Two channels are formed in the hub 91 one of which 129 serves as an air supply from the channel 94 hollowed out of the cone 90 and fed by the pipe 96. The channel 129 leads to the blow-pipe nozzle 107 by means of the extensible tube 130, the second channel 131 formed in front of the channel fed by the gas pipe brings this carburetter in the chamber 132 of the blow-pipe 107.

This machine operates in the following manner: The piece or blank to be molded having been placed as an inside lining in the mold 124 the latter is placed on the tray or platform 121 and tightened within the jaws 123, when a weighing operation is effected by placing the armed hub 91 in a horizontal position and the equilibrium is obtained by means of the movable counterweight 104 which is then fixed. The metal which has to be cast is weighed and the counterweight is drawn back upon the specially graduated steel yard. According to the weight found, this process ensures a perfect equilibrium of the machine during the rotation of the hub, the weight of the masses in motion being distributed with accuracy; this equilibrium is unlimited as it constantly compensates the loss of weight of the cylinders forming the mold, this loss being due to the rapid oxydation of the metal under the action of heat.

The taps 97 and 99 are subsequently opened in their normal position of supply, the blow-pipe 107 is lighted and the heated mold is then placed on the tray 121 and fixed by means of the jaws 123 handled by turning the movable disc 125 which is then locked by the screw 128 when the metal to be cast is run into the cavity of the mold 124 made for that purpose.

The tap 97 is subsequently opened by the crank rod 100 and the flexible connection 101 and the electric motor 75 is next started. The latter actuates the air compressor 77 which supplies the air needed for the working of the blow-pipe 107. By means of the rod 100 the gas tap and the air and gas tap are so regulated as to obtain a proper mixture of air and gas for the fusion of the metal. This fusion is urged on owing to the vertical position of the blow pipe 107. When the fusion is completed, the handle 97 is pushed into the free part of the toothed sector 86 where it is hooked, the flexible connection 86 is used to draw the fork 83 which applies the disc provided with a movable sleeve 80 onto the flat disc 79 already at work. The connnection is thus soft and strong. The main axis propelled rotates the armed hub 91 and the mold 124 which turn in a vertical plane. Air and gas continuing to pass through the blow-pipe 107 and through the channels 94 and 95 keep the metal in fusion for the time required.

Centrifugal force causes the handle 120 supporting the tray 121 and the mold 124 to come into a line with the extension of the blow-pipe 107 and thus expels the molten metal through the tap holes of the cavity which is the mold of the piece made.

Under the impulse given by the gearing, the tray 121 and the tray 120 rocking about the axis 119 through the ring 118 have a tendency to assume a certain angle relatively to the blow-pipe axis. The rod 117 forming a part of the ring 118 exerts then a pressure by means of the connecting rod 116 of the disc 115 upon a spring 114 which compensates such backward motion. The tray 121 and the handle 120 return—under the action of centrifugal force—in a line with the axis of the blow-pipe 107, but the spring 114 may impart while expanding too great a speed to this motion wherefore this sudden motion is checked by the spring 114ª compressed by the connecting rod 116ª of the disc 115ª. The result is a compensation in the shifting motion of the rod 117 which is softly brought back to its initial position.

When the casting is thought to be completed under proper conditions, the tap 99 is closed by pushing the rod 100, the compressor continuing to supply air which passes through the blow-pipe 107 and cools the mold 124.

The electric motor is then stopped as well as the hub arm 91 the screw 128 is loosened, the mold 124 is disengaged by opening the jaws 123 with the movable disc 125, the handle 87 is then unhooked from the toothed sector 88 and brought back to its initial position; this operation having for its object to disconnect the gear, the special spring 84 pushing the sleeve 81 loosens the disc 90 from the flat disc 79.

It must be well understood that other methods and other modes of carrying the invention into practical effect may be used and that the details of construction of the machine may be modified, for instance the electric motor may be replaced by a spring stretched by a crank handle or even simply by a crank handle alone to replace the motor and the spring. Or the electric motor may be replaced by a benzol micro-motor. In the same manner a machine having the same particulars may be constructed with a vertical main axis and a horizontal hub so that its rotary motion be horizontal instead of vertical. Instead of one arm for the tray a sector formed of several arms may be used each provided with a blow-pipe and a tray. At each end of the hub arms a blow-pipe and a tray may be substituted for the counterweight. For melting the metal under treatment petroleum gas, alcohol, acetylene gas, compressed lighting gas, oxhydric blow pipes may be used, or a blow-pipe fed with compressed lighting gas and oxygen or supplied with compressed lighting gas provided with a chamber wherein a vacuum is formed through air exhausted by the rapid passage of carburetting gas.

We claim:

1. A molding machine of the character described comprising a rotating mold, a blow-pipe nozzle adjacent said mold and rotating therewith, means for rotating said mold and nozzle, and means for supplying fuel and compressed air to said nozzle during rotation.

2. A molding machine as claimed in claim 1, including a shaft, a cylinder having bearings for said shaft one of which is a truncated-cone-shaped end of said cylinder, a hub carried by one end of said shaft and snugly embracing and rotating upon said cone-shaped end, and radial arms carried by said hub, one of which carries said mold and nozzle, said rotating means comprising a motor and clutch means for driving said shaft by said motor.

3. In a molding machine of the character described, the combination with a rotating mold and a blow-pipe nozzle adjacent said mold and rotating therewith, of a shaft for said rotating elements, driving means for said shaft, a cylinder having bearings for said shaft one of which is provided with passages communicating from the inside of the cylinder to the outside of said bearing, and a hub for said rotating elements carried by said shaft and snugly embracing and rotating upon said bearing, said hub having passages therein leading to said nozzle and terminating in annular channels which register with said passages in the bearing, whereby compressed air and fuel may be supplied through said passages to the nozzle during rotation.

4. In a molding machine of the character described, the combination with the elements claimed in claim 3 of a lower cylinder attached to said first named cylinder and containing said driving means, an air compressor in said lower cylinder and driven by said driving means and having communication with one of said passages in said bearing, a fuel supply having communication with another of said passages, and means for independently controlling said air and fuel supplies.

5. A molding machine of the character described, comprising a framework, an electric motor and an air compressor carried by the framework, the air compressor being driven by the motor, a shaft carried by the framework, clutch means for driving the shaft by the motor, and a centrifugal molding device carried by one end of said shaft, said device comprising a hub and oppositely extending radial arms, a counterweight carried by one of the arms, and a mold bucket pivotally carried by the other arm, a blow-pipe nozzle carried by the latter arm and extending into said bucket, a fuel supply, and means for conducting fuel and compressed air from the fuel supply and the compressor respectively through the hub and the latter arm to said blow-pipe nozzle.

6. In a molding machine of the character described, the combination of a framework comprising a lower cylinder and an upper cylinder attached thereto and having a truncated-cone-shaped end, an electric motor and an air compressor in said lower cylinder, said compressor being driven by said motor, a shaft in said upper cylinder and projecting through said cone-shaped end, and a centrifugal molding device carried by said projecting shaft end and having a hub snugly embracing said cone-shaped cylinder end, said hub and cone-shaped end being provided with channels for the passage therethrough of air from the compressor and fuel to said molding device.

7. In a molding machine of the character described, the combination with a rotating mold, of a tray for said mold provided with adjustable clamps for removably gripping said mold, a shaft and driving means therefor, radial arms carried by said shaft, one thereof carrying an adjustable counterweight and the other pivotally supporting said tray, and means for preventing excessive pivotal movement of said tray relative to its arm when rotation of said arm is started or stopped.

8. In a molding machine of the character described, the combination with a rotating mold, of a tray for said mold provided with adjustable clamps for removably gripping said mold, a shaft and driving means therefor, radial arms carried by said shaft, one thereof carrying an adjustable counterweight and the other pivotally supporting said tray, means for preventing excessive pivotal movement of said tray relative to its arm when rotation of said arm is started or stopped, comprising juxtaposed springs carried by said arm, and a projection integral with the tray and interposed between said springs to engage one thereof when said relative pivotal movement occurs.

9. In a molding machine of the character described, the combination with a rotating mold, of a tray for said mold provided with adjustable clamps for removably gripping said mold, said tray comprising two superposed relatively movable discs, the upper thereof having straight radial slots, the under thereof having spiral slots, said adjustable clamps having portions projecting through said slots whereby relative movement of said under disc will cause radial displacement of said clamps, a shaft and driving means for said mold and radial arms carried by said shaft, one thereof carrying an adjustable counterweight and the other pivotal of said tray.

10. A molding machine as claimed in claim 1, said rotating means comprising a shaft for said rotating elements, a friction disc splined thereto, a motor-driven friction roller adjacent said disc, resilient means for normally keeping the roller and disc apart, and mechanical means for bringing them together to cause rotation of the disc and hence the shaft.

In testimony whereof we affix our signatures.

GEORGES LOUIS VICTOR MAES.
ARMAND LEON CLEMENT MAES.